US012609928B2

(12) United States Patent
Hutcheson

(10) Patent No.: US 12,609,928 B2
(45) Date of Patent: Apr. 21, 2026

(54) CLIENT DEVICE HAVING AGENT APPLICATION CONFIGURED TO COMMUNICATE WITH WEB SERVER ENDPOINT FOR AUTHENTICATION

(71) Applicant: Dell Products L.P., Round Rock, TX (US)

(72) Inventor: Jacob R. Hutcheson, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 673 days.

(21) Appl. No.: 18/087,298

(22) Filed: Dec. 22, 2022

(65) Prior Publication Data

US 2024/0214378 A1      Jun. 27, 2024

(51) Int. Cl.
*H04L 9/40*          (2022.01)

(52) U.S. Cl.
CPC ...... *H04L 63/0876* (2013.01); *H04L 63/0435* (2013.01); *H04L 63/0853* (2013.01)

(58) Field of Classification Search
CPC ............. H04L 63/0876; H04L 63/0435; H04L 63/0853
See application file for complete search history.

(56) References Cited

U.S. PATENT DOCUMENTS

2017/0118025 A1* 4/2017 Shastri ...................... H04L 9/00
2017/0257363 A1* 9/2017 Franke ................ H04W 12/069
2020/0213297 A1* 7/2020 Suraparaju .......... H04L 63/0892
2022/0272117 A1* 8/2022 Maheve .............. H04L 63/1416
2024/0121238 A1* 4/2024 Chin ................... H04L 63/0853

OTHER PUBLICATIONS

I. Fette et al., "The WebSocket Protocol," Internet Engineering Task Force, Request for Comments: 6455, Dec. 2011, 71 pages.
M. Jones et al., "JSON Web Signature (JWS)," Internet Engineering Task Force, Request for Comments: 7515, May 2015, 59 pages.
M. Jones et al., "JSON Web Encryption (JWE)," Internet Engineering Task Force, Request for Comments: 7516, May 2015, 51 pages.
M. Jones et al., "JSON Web Token (JWT)," Internet Engineering Task Force, Request for Comments: 7519, May 2015, 30 pages.

* cited by examiner

*Primary Examiner* — Rupal Dharia
*Assistant Examiner* — Devin E Almeida
(74) *Attorney, Agent, or Firm* — Ryan, Mason & Lewis, LLP

(57)          ABSTRACT

An apparatus comprises at least one processing device including a processor and a memory. The at least one processing device is configured to implement an agent application for supporting an authentication process between a client device and a web server over at least one network, to register the agent application with an operating system of the client device, and in conjunction with initiation of the authentication process via a web browser of the client device, to obtain a uniform resource identifier (URI) from the web server, the URI corresponding to a particular endpoint of the web server, and to make the URI accessible to the agent application via the operating system. The at least one processing device is further configured to carry out one or more authentication operations of the authentication process at least in part through interaction between the agent application and the particular endpoint of the web server.

20 Claims, 7 Drawing Sheets

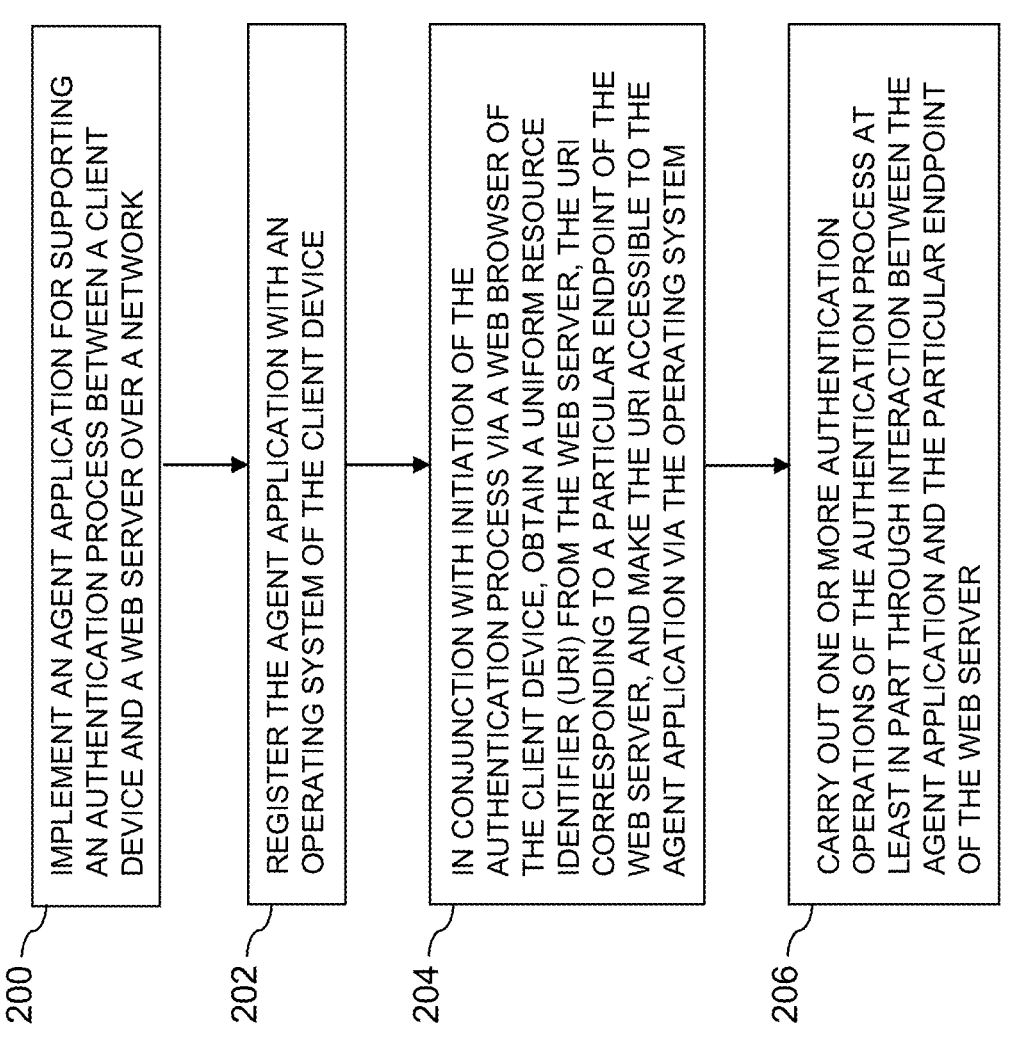

200 — IMPLEMENT AN AGENT APPLICATION FOR SUPPORTING AN AUTHENTICATION PROCESS BETWEEN A CLIENT DEVICE AND A WEB SERVER OVER A NETWORK

202 — REGISTER THE AGENT APPLICATION WITH AN OPERATING SYSTEM OF THE CLIENT DEVICE

204 — IN CONJUNCTION WITH INITIATION OF THE AUTHENTICATION PROCESS VIA A WEB BROWSER OF THE CLIENT DEVICE, OBTAIN A UNIFORM RESOURCE IDENTIFIER (URI) FROM THE WEB SERVER, THE URI CORRESPONDING TO A PARTICULAR ENDPOINT OF THE WEB SERVER, AND MAKE THE URI ACCESSIBLE TO THE AGENT APPLICATION VIA THE OPERATING SYSTEM

206 — CARRY OUT ONE OR MORE AUTHENTICATION OPERATIONS OF THE AUTHENTICATION PROCESS AT LEAST IN PART THROUGH INTERACTION BETWEEN THE AGENT APPLICATION AND THE PARTICULAR ENDPOINT OF THE WEB SERVER

FIG. 2

```
{
    action: "authenticate",
    endpoint: https://oob.auth.example.org
    nonce:
"8ST2KVTJ9v/nSv0n2i3x3F2Pyn4w7/XtNAZGRpw93PjtDR72i4AlPclFV
aQczRwOmU1QX71aTmOGsPVbbdbJ7Q=="
}
```

FIG. 5A exampleprotocol://e2FjdGlvbjoiYXV0aGVudGljYXRlIixlbmRw
b2ludDogImh0dHBzOi8vb29iLmF1dGguZXhhbXBsZS5vcmciLG5vbm
NlOiI4U1QyS1ZUSjl2L25TdjBuMmkzeDNGMlB5bjR3Ny9YdE5BWkdS
cHc5M1BqdERSNzJpNEFsUGNsRlZhUWN6UndPbVUxUVg3MWFUbU9Hc1
BWYmJkYko3UT09In0

FIG. 5B

CLIENT DEVICE HAVING AGENT APPLICATION CONFIGURED TO COMMUNICATE WITH WEB SERVER ENDPOINT FOR AUTHENTICATION

FIELD

The field relates generally to controlling access to information resources, and more particularly to techniques for implementing user authentication in an information processing system.

BACKGROUND

Information processing systems are typically configured to require user authentication before granting a corresponding client device access to protected resources available over a network such as the Internet. Unfortunately, recent changes to web browsers have unduly limited the range of authentication techniques that are available to users. For example, users may still wish to use legacy SmartCards for multi-factor authentication (MFA), but the technologies traditionally used to integrate SmartCards into applications, such as ActiveX controls and Java applets, have been dropped from most modern web browsers. An alternative approach relies on the use of client certificate authentication, but this approach has practical limitations that adversely impact both ease-of-use as well as security.

SUMMARY

Illustrative embodiments disclosed herein provide techniques for highly secure and flexible authentication that avoid the above-noted drawbacks of conventional approaches. For example, some embodiments advantageously facilitate authentication of legacy SmartCards and other MFA arrangements for which authentication would otherwise be impossible or impractical using a modern web browser. One or more such embodiments illustratively configure an agent application on a client device for bidirectional out-of-band communication with a particular endpoint of a web server, such as a WebSocket endpoint, in a manner that enhances end-to-end security of the authentication process, including an ability to provide non-repudiation of users and their associated client devices. The agent application in some embodiments acts as a bridge to legacy MFA technologies, and can provide native interactions with Smart-Cards or other physical MFA arrangements that modern web browsers no longer support.

In an illustrative embodiment, an apparatus comprises at least one processing device that includes a processor coupled to a memory, with the at least one processing device being configured to implement an agent application for supporting an authentication process between a client device and a web server over at least one network, to register the agent application with an operating system of the client device, and in conjunction with initiation of the authentication process via a web browser of the client device, to obtain a uniform resource identifier (URI) from the web server, the URI corresponding to a particular endpoint of the web server, and to make the URI accessible to the agent application via the operating system. The at least one processing device is further configured to carry out one or more authentication operations of the authentication process at least in part through interaction between the agent application and the particular endpoint of the web server.

In some embodiments, registering the agent application with the operating system of the client device illustratively comprises registering the agent application as a handler application for a protocol utilizing the URI, the protocol being triggered by receipt of the URI in the operating system from the web browser.

The URI is illustratively received as part of an encrypted message payload that is decrypted by the agent application to obtain the URI and a corresponding nonce value generated by the web server. The nonce value is utilized by the agent application in carrying out the one or more authentication operations with the particular endpoint.

In some embodiments, the agent application is configured for bidirectional out-of-band communication with the particular endpoint of the web server. In such an embodiment, the bidirectional out-of-band communication between the agent application and the particular endpoint of the web server illustratively bypasses the web browser.

These and other illustrative embodiments include, without limitation, systems, apparatus, methods and computer program products comprising processor-readable storage media.

BRIEF DESCRIPTION OF THE DRAWINGS

FIG. 2 is a flow diagram of an example process involving utilization of an agent application configured to communicate with an endpoint of a web server for authentication in an illustrative embodiment.

FIGS. 5A and 5B show examples of a message payload from a web server and a corresponding encoded URI for that message payload in an illustrative embodiment. These figures are collectively referred to herein as FIG. 5.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources, as well as other types of systems comprising a combination of cloud and edge infrastructure. Numerous different types of enterprise computing and storage systems are also encompassed by the term "information processing system" as that term is broadly used herein.

Figure 1:
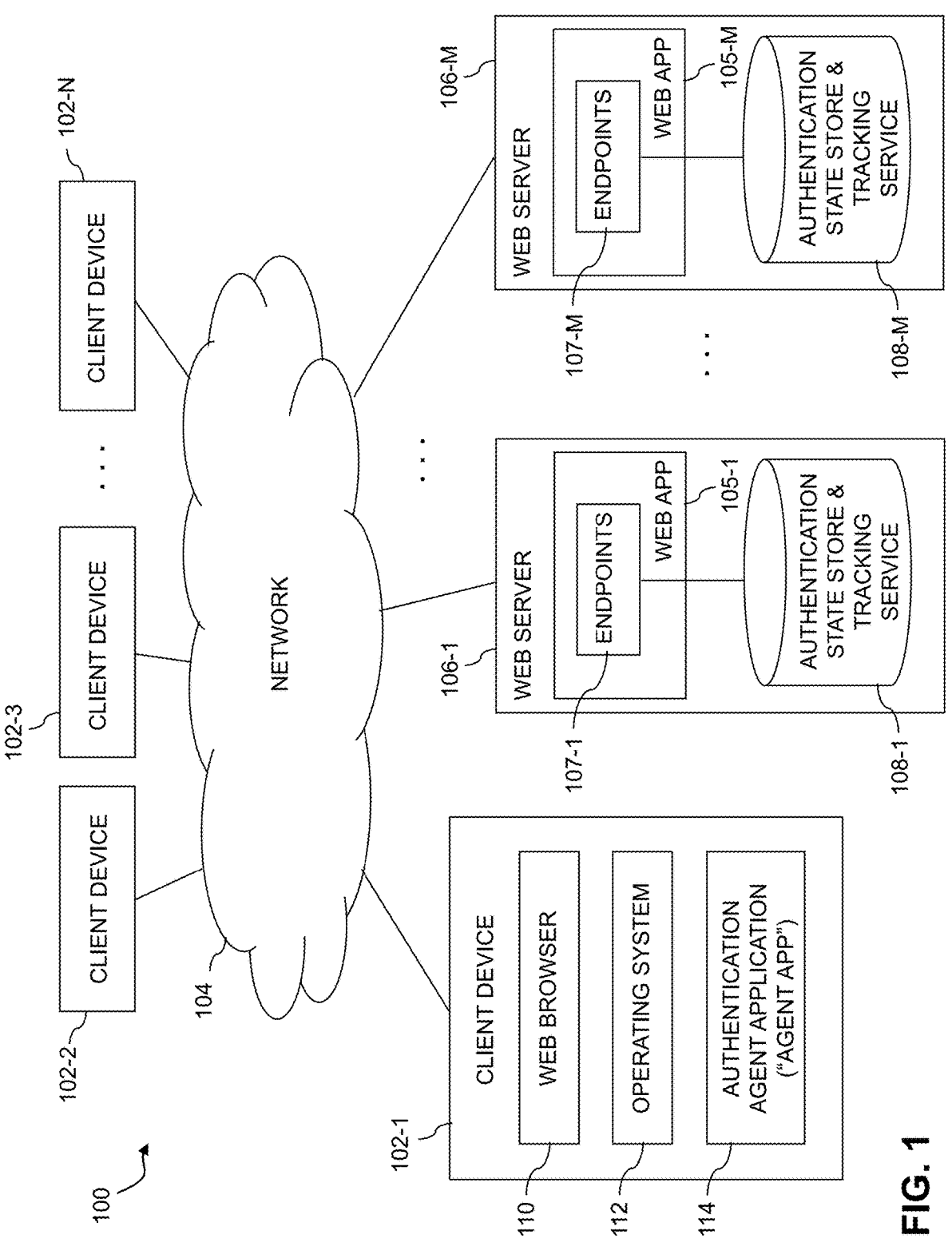
FIG. 1 is a block diagram of an information processing system comprising a client device that includes an agent application configured to communicate with an endpoint of a web server for authentication in an illustrative embodiment.

FIG. 1 shows an information processing system 100 configured in accordance with an illustrative embodiment. The information processing system 100 comprises a plurality of client devices 102-1, 102-2, 102-3, . . . 102-N, collectively referred to herein as client devices 102. The client devices 102 are coupled to a network 104. The system 100 further comprises a plurality of web applications ("web apps") 105-1, . . . 105-M, collectively referred to herein as web applications 105, implemented on respective ones of a plurality of web servers 106-1, . . . 106-M, collectively referred to herein as web servers 106. The web applications 105 comprise respective sets of endpoints 107-1, 107-M, each comprising one or more endpoints and collectively referred to herein as endpoints 107. The endpoints 107 of the web applications 105 communicate with respective instances of authentication state store and tracking services 108-1, . . . 108-M, collectively referred to as authentication state store and tracking services 108, within the corresponding web servers 106.

The client device 102-1 as illustrated comprises a web browser 110, an operating system 112 and an authentication agent application 114, also referred to herein as an "agent application" or an "agent app." Each of one or more of the other client devices 102 can be configured in a similar manner.

It should be noted that the configuration of the client devices 102, network 104, web applications 105, web servers 106, endpoints 107 and authentication state store and tracking services 108 can be varied relative to the example arrangement shown in FIG. 1. For example, in other embodiments, multiple web applications and their associated endpoints and authentication state store and tracking services can be implemented in a single web server, or such components may be distributed across multiple web servers.

A given one of the client devices 102 may comprise, for example, a mobile telephone, a laptop computer, a tablet computer, a desktop computer or another type of device from which a user authenticates to one or more of the web servers 106 in order to obtain access to secure content of one or more of the endpoints 107. Such client devices 102 are examples of what are more generally referred to herein as "processing devices." It is also possible that one or more of the client devices 102 may be implemented at least in part using cloud-based virtualization infrastructure such as a virtual machine or container. A given one of the client devices 102 is illustratively equipped with at least one web browser 110, such as a Google Chrome web browser, a Microsoft Edge web browser, a Microsoft Internet Explorer web browser, a Mozilla Firefox browser, or another suitable web browser. Combinations of multiple distinct web browsers may be implemented on the given client device.

The client devices 102 in some embodiments comprise respective computers associated with a particular company, organization or other enterprise. In addition, at least portions of the information processing system 100 may also be referred to herein as collectively comprising an "enterprise network." Numerous other operating scenarios involving a wide variety of different types and arrangements of processing devices and networks are possible, as will be appreciated by those skilled in the art.

The client devices 102 are assumed to be associated with one or more users of the system 100. For example, such users can access protected resources of the system 100, such as protected resources of one or more of the web servers 106, by initiating a login via the web browser 110 of one of the client devices 102. The term "client device" as used herein is intended to be broadly construed so as to encompass a wide variety of different types of processing devices or combinations of multiple such devices that are configured to participate in a user authentication protocol using the techniques disclosed herein. A client system comprising multiple distinct processing devices is therefore considered a type of "client device" as that latter term is broadly used herein.

Also, it is to be appreciated that the term "user" in this context and elsewhere herein is intended to be broadly construed so as to encompass, for example, human, hardware, software or firmware entities, as well as various combinations of such entities.

Although multiple client devices 102 and web servers 106 are shown in the FIG. 1 embodiment, other embodiments can include a single client device and/or a single web server rather than multiple instances of such components. The variables N and M denoting respective numbers of client devices 102 and web servers 106 are therefore considered arbitrary integer values greater than or equal to one.

The network 104 is assumed to comprise a portion of a global computer network such as the Internet, although other types of networks can be part of the information processing system 100, including a wide area network (WAN), a local area network (LAN), a satellite network, a telephone or cable network, a cellular network such as a 4G or 5G network, a wireless network such as a WiFi, WiMAX, Bluetooth or near field communication (NFC) network, or various portions or combinations of these and other types of networks. The information processing system 100 in some embodiments therefore comprises combinations of multiple different types of networks each comprising processing devices configured to communicate using IP or other related communication protocols. Numerous alternative networking arrangements are possible in a given embodiment, as will be appreciated by those skilled in the art.

The authentication state store and tracking services 108 illustratively store respective sets of access credentials such as usernames and passwords for their respective web servers 106 and endpoints 107 and for user accounts of each of one or more users of the client devices 102. Other types of user account information, such as login cookies, can also be stored for respective ones of a plurality of user accounts. The passwords, usernames, login cookies and other types of user account information may be stored in a given one of the authentication state store and tracking services 108 in encrypted form. Examples of other types of user account information that may be stored in a given one of the credential databases include other characteristics of the user and/or the client devices of that user, as well as other types of information characterizing user behavior. These other types of user account information can further include any type of information that may be applied or otherwise utilized in conjunction with a given user authentication protocol implemented within system 100.

The access credentials in some embodiments comprise, for example, a username and a password, and at least one additional authentication factor, such as a SmartCard, mobile telephone, or other device, user possession of which is verified as part of the authentication process. The protected resource illustratively comprises, for example, an access-controlled user account of a website. A wide variety of other types of access credentials and associated protected resources may be utilized in other embodiments.

For example, in some embodiments, the protected resource can be an entire website, rather than any particular user account on that website. In other words, the website in its entirety may be considered the protected resource in some embodiments.

As another example, the protected resource may comprise an external interface to a protected processing device or set of such processing devices.

The authentication state store and tracking services 108 in the present embodiment are illustratively implemented as part of one or more storage systems coupled to or otherwise associated with one or more processing devices of the respective web servers 106. Such storage systems can comprise any of a variety of different types of storage including by way of example network-attached storage (NAS), storage area networks (SANs), direct-attached storage (DAS) and distributed DAS, as well as combinations of these and other storage types, including but not limited to flash storage, storage arrays, software-defined storage, cloud storage and object-based storage.

Although shown as being arranged internally to the web servers 106 in the illustrative embodiment of FIG. 1, the authentication state store and tracking services 108 in some embodiments can be arranged at least in part externally to their respective corresponding web servers 106 in other embodiments. For example, at least portions of the authentication state store and tracking services 108 can be implemented as respective in-memory databases utilizing one or more memories of at least one processing device that also implements at least portions of the respective corresponding web servers 106.

As indicated above, recent changes to web browsers have unduly limited the range of authentication techniques that are available to users. For example, users may still wish to use legacy SmartCards for MFA, but the technologies traditionally used to integrate SmartCards into applications, such as ActiveX controls and Java applets, have been dropped from most modern web browsers. An alternative approach relies on the use of client certificate authentication, but this client certificate authentication approach has practical limitations that adversely impact both ease-of-use as well as security.

Historically, SmartCard authentication was handled through the use of native application code that was run, on-demand, and distributed directly from a web application. This was generally done through either ActiveX controls or Java applets. In either case, it was this native code that interfaced with drivers provided by a SmartCard vendor. Both of these technologies are no longer supported in web browsers for security reasons.

In the absence of those end-of-life technologies, an alternative approach is to implement SmartCard support through the above-noted client certificate authentication. This approach delegates support of SmartCards to the client device operating system. More particularly, when a web application wants to authenticate a user via SmartCard, the web server requires a given client device to present a client certificate as part of its transport layer security (TLS) handshake, which causes the web browser to prompt the user to provide a client certificate to complete the exchange. In this approach, the client device operating system will provide the SmartCard as an option for the user, and the user would then enter the PIN, allowing the web browser to use the SmartCard as the client certificate.

This client certificate authentication approach suffers from a number of issues, due to the reliance on the TLS handshake to convey the authentication information to the web server. By design, most modern web browsers implement certificate-handling behavior that can lead to compromise of a client certificate based identity solution.

For example, client certificates are part of the TLS connection to the web server. The web server indicates that it requires a client certificate, prompting the web browser to ask the user to provide one. This creates situations where multiple web endpoints must be used to selectively support client certificate authentication for some users but not others.

As another example, web browsers typically cache client certificates for a given domain for the lifetime of a given browser instance. For security reasons, browsers do not provide a programmatic way to "forget" client certificates on logout. This leads to situations where to fully log out of a web application, the user must be aware that he or she needs to close all browser windows before walking away.

Additionally, when relying on client certificates to enable SmartCard MFA, there are difficulties in enabling additional factors of authentication, and correlating the SmartCard to a specific user identity, as only the card itself and the user's possession of the card's PIN are verified. Identifying information about the user is superficially based on fields of the client certificate. There is also no opportunity to provide additional client validation, as the client certificate belongs to the user, instead of being available to verify the physical client device itself.

Illustrative embodiments disclosed herein provide techniques for highly secure and flexible authentication that avoid the above-noted drawbacks of conventional approaches. For example, some embodiments advantageously facilitate authentication of legacy SmartCards and other MFA arrangements for which authentication would otherwise be impossible or impractical using a modern web browser.

One or more such embodiments illustratively configure the agent application 114 on a given one of the client devices 102 for bidirectional out-of-band communication with a particular one of the endpoints 107 of one of the web servers 106, such as a WebSocket endpoint, in a manner that enhances end-to-end security of the authentication process, including an ability to provide non-repudiation of users and their associated client devices.

The agent application 114 in some embodiments acts as a bridge to legacy MFA technologies, and can provide native interactions with SmartCards or other physical MFA arrangements that modern web browsers no longer support.

In an illustrative embodiment, client device 102-1 is configured to implement the agent application 114 for supporting an authentication process between the client device 102-1 and a particular one of the web servers 106, illustratively web server 106-1, over the network 104, which as indicated previously may comprise a combination of multiple distinct networks. The client device 102-1 is further configured to register the agent application 114 with the operating system 112 of the client device 102-1.

In conjunction with initiation of the authentication process via the web browser 110 of the client device 102-1, the client device 102-1 obtains a uniform resource identifier (URI) from the web server 106-1, where the URI corresponds to a particular one of the endpoints 107-1 of the web server 106-1, and makes the URI accessible to the agent application 114 via the operating system 112. One or more authentication operations of the authentication process are then carried out at least in part through interaction between the agent application 114 and the particular endpoint of the web server 106-1.

The terms "uniform resource identifier" and URI as used herein are intended to be broadly construed, so as to encompass, for example, a uniform resource locator (URL) or other type of identifying information characterizing a web application and/or an associated endpoint of a webserver.

The client device 102-1 or one or more portions therefore are examples of what is more generally referred to herein as "at least one processing device." Other arrangements of one or more processing devices can be used to implement agent-based authentication functionality as disclosed herein.

Also, although this portion of the description refers to client device 102-1 and web server 106-1, it is to be understood that other ones of the client devices 102 and the web servers 106 are configured to operate in manner similar to that described with reference to client device 102-1 and web server 106-1.

In some embodiments, registering the agent application 114 with the operating system 112 of the client device 102-1 illustratively comprises registering the agent application 114 as a handler application for a custom protocol utilizing the URI, the custom protocol being triggered by receipt of the URI in the operating system 112 from the web browser 110. The URI is illustratively received as part of an encrypted message payload that is decrypted by the agent application 114 to obtain the URI and a corresponding nonce value generated by the web server 106-1. The nonce value is utilized by the agent application 114 in carrying out the one or more authentication operations with the particular endpoint.

The particular endpoint of the web server 106-1 in some embodiments illustratively comprises a WebSocket endpoint of the web server 106-1, although other types of endpoints may be used as the particular endpoint.

The agent application 114 is illustratively configured for bidirectional out-of-band communication with the particular endpoint of the web server 106-1. The bidirectional out-of-band communication between the agent application 114 and the particular endpoint of the web server 106-1 illustratively bypasses the web browser 110.

In some embodiments, the authentication process comprises an MFA process involving a SmartCard, and the one or more authentication operations carried out at least in part through interaction between the agent application 114 and the particular endpoint of the web server 106-1 comprise authenticating the SmartCard. Other types of authentication processes utilizing additional or alternative authentication factors may be used. References herein to use of a Smart-Card as an authentication factor in some embodiments are therefore made by way of illustrative example only. Also, the term "SmartCard" as used herein is intended to be broadly construed, so as to encompass, for example, physical cards in a wide variety of different form factors, as well as virtual cards that are implemented, for example, using software on a mobile telephone, computer or other processing device.

The web server 106-1 in some embodiments illustratively comprises, as part of its set of endpoints 107-1, and in addition to the particular endpoint (e.g., a WebSocket endpoint) described above, at least one of a login endpoint and an MFA endpoint.

For example, in some embodiments, the web browser 110 of the client device 102-1 illustratively initiates a user login via a first browser tab to the login endpoint of the web server 106-1. Based at least in part on information provided to the web browser 110 by the login endpoint, the web browser 110 illustratively opens a second browser tab to the MFA endpoint of the web server 106-1.

The MFA endpoint of the web server 106-1 illustratively provides the URI to the web browser 110 as part of an encrypted message payload that includes additional information to be utilized by the agent application 114 in carrying out the one or more authentication operations. The additional information may comprise, for example, at least one nonce value generated by the web server 106-1. Other types of values, such as state values, may be used in place of or in addition to the at least one nonce value.

In some embodiments, the agent application 114 is configured with access to key material to be used in the authentication process and is further configured with an associated certificate unique to the agent application 114 and the client device 102-1. It should be noted that this certificate associated with the agent application 114 is distinct from the client certificates previously mentioned herein, as it is unique to the agent application 114 as well as to the client device 102-1. The agent application 114 utilizes at least a portion of the key material to decrypt the encrypted message payload to obtain the URI and the additional information to be utilized by the agent application 114 in carrying out the one or more authentication operations.

The agent application 114 illustratively attempts to establish a secure connection to the particular endpoint at the URI at least in part by providing its certificate and the nonce value to the particular endpoint.

The particular endpoint initiates verification of the certificate and nonce value provided by the agent application 114, and responsive to successful verification of the certificate and nonce value, the particular endpoint establishes the secure connection, correlates the certificate and nonce value with a corresponding user login attempt previously initiated by the web browser 110, sends a challenge to the agent application 114, receives a corresponding response from the agent application 114, and determines an authentication result based at least in part on the corresponding response. Other types of authentication processes and associated authentication operations can be used in other embodiments. Additional detailed examples of such authentication processes are described below.

In an illustrative example of an authentication process utilizing the agent application 114 and endpoints 107-1 of the web server 106-1, a setup is initially performed to configure agent application 114 on client device 102-1, as follows:

1. The agent application 114 registers itself with the operating system 112 as the handler application for a custom URI protocol.

2. The agent application 114 is configured with key material to be used during authentication, illustratively including key material necessary to decrypt payloads provided by the web server 106-1 to which the agent application is authenticating, and a dedicated certificate, unique to that client device and agent application installation. A root certificate authority (CA) of this certificate is made available to the web application 105-1 of web server 106-1 for use in the authentication process.

3. On the web server 106-1 providing authentication, several endpoints 107-1 are made available, including a login endpoint providing a user interface (UI) to initiate authentication, an MFA endpoint to bootstrap the interaction between the web browser 110, the agent application 114, and the web server 106-1, and a WebSocket endpoint providing bidirectional out-of-band interaction between the agent application 114 and the web server 106-1.

After the above-described setup, authentication of a given user of the client device 102-1 proceeds as follows:

1. The user navigates via the web browser 110 to the login endpoint, which instructs the web browser 110 to open a new tab to the MFA endpoint if needed.

2. The web browser 110 opens the tab to the MFA endpoint. This endpoint then generates a message identifying the custom URI protocol, including a JSON Web Encryption (JWE) payload that contains the URI of the WebSocket endpoint and a nonce value that is correlated to the user session that initiated the login process, where JSON denotes JavaScript Object Notation. JWE is described in Internet Engineering Task Force (IETF) Request for Comments (RFC) 7516, May 2015, which is incorporated by reference herein in its entirety. Other message formats and encryption techniques may be used in other embodiments.

3. The web browser 110 detects the custom URI protocol and provides the JWE payload containing the URI and the nonce to the agent application 114 via the operating system 112.

4. The agent application 114, using the shared key provided during installation, decrypts the JWE payload and extracts WebSocket endpoint URI, and the nonce value.

5. The agent application 114 attempts to create a secure WebSocket (WSS) connection to the WebSocket endpoint, providing its certificate and nonce value to the web server 106-1.

6. The WebSocket endpoint verifies the certificate and nonce value, and captures the certificate information, correlating that to the original login request and the corresponding user identity.

7. If both the certificate and nonce value are verified, the WSS connection is established.

8. Once the WSS connection is established, the web server 106-1 generates an opaque challenge value (e.g., a securely generated random string), and sends a message via the WebSocket endpoint to the agent application 114, requesting verification.

9. The agent application 114, upon receiving the challenge, prompts the user to select the authentication factor certificate to use for authentication. For example, in the case of a SmartCard, the user would be prompted by the operating system 112 to enter a PIN for the SmartCard in order to access one or more stored certificates for that SmartCard.

10. The agent application 113 uses the private key of the unlocked SmartCard to sign the challenge value, and sends a message to the web server 106-1 with this challenge response.

11. The web server 106-1 verifies this signature using the public key of the SmartCard corresponding to the particular user and user session which initiated authentication.

12. If the signature is valid, then the user has authenticated and the login is allowed to proceed.

It is to be appreciated that the particular operations in this example are illustrative only, and should not be construed as limiting in any way. Other embodiments can use different types and arrangements of operations.

The example authentication process described above uses a custom URI protocol handler with an encrypted payload to securely bridge an on-demand browser authentication workflow and a native application, in a way that works across any operating system, while overcoming the drawbacks of conventional approaches.

By using an out-of-band WebSocket connection to perform challenges against SmartCard hardware, multiple factors of authentication and audit trail are actually in play. The authentication request and policy enforcement on the web server 106-1 has access to both to whether the user can perform MFA with a given SmartCard (i.e., has the physical card and access to its certificate, and knows the PIN of the physical card), as well as the identity of the client device from which the authentication request is being handled. This creates the opportunity to implement specific authentication policies (e.g., only users A and B are valid from terminal C), as well as to embed attestation of the physical system into the decision and audit logging (e.g., why was user X at terminal Y on date Z?)

These and other illustrative embodiments disclosed herein do not suffer from the above-noted drawbacks of conventional approaches, such as the conventional client certificate authentication described elsewhere herein.

Moreover, the agent-based approach of illustrative embodiments provides much more flexibility and security in how SmartCard support is provided, in a consistent way across multiple programs and systems. Similar advantages can be obtained using other types and arrangements of authentication factors.

This agent-based approach is a significant improvement over established practice and would be valuable to any organization wanting to maintain legacy MFA technologies such as SmartCards in their IT environments.

The foregoing agent-based authentication arrangements and associated interactions between a given client device and one or more web servers are examples only, and can be varied in other embodiments.

It is to be appreciated that the particular set of system elements and other components and associated functionality as illustrated in the system 100 of the FIG. 1 embodiment is presented by way of example only, and a wide variety of alternative arrangements can be used in other embodiments. For example, at least portions of the functionality associated with client-side components such as web browser 110 and agent application 114 in other embodiments can be combined into a single component, or separated across a larger number of components. Similarly, at least portions of the functionality associated with server-side components such as web applications 105, endpoints 107 and authentication state store and tracking services 108 in other embodiments can be combined into a single component, or separated across a larger number of components.

It should also be noted that client-side components such as web browser 110, operating system 112 and agent application 114, and server-side components such as web applications 105, endpoints 107 and authentication state store and tracking services 108, are illustratively implemented at least in part in the form of software comprising program code stored in memory and executed by a processor.

An illustrative embodiment of an example process for agent-based authentication in the information processing system 100 will now be described in more detail with reference to the flow diagram of FIG. 2.

In this embodiment, it is assumed that a user associated with a particular one of the client devices 102, illustratively the client device 102-1, would like to authenticate to a particular one of the web servers 106, illustratively the web server 106-1, in order to obtain access to protected resources of the system 100.

The process as illustrated includes steps 200 through 206, which are illustratively performed primarily by the client device 102-1 via its web browser 110, operating system 112 and agent application 114, through interaction with one or more of the endpoints 107-1 of the web server 106-1, although additional or alternative system components may be used. It is also to be understood that this particular process is only an example, and additional or alternative processes can be carried out in other embodiments.

In step 200, an agent application is implemented on a client device for supporting an authentication process between the client device and a web server over a network.

In step 202, the agent application is registered with an operating system of the client device. Such registration can take any of a number of various forms, but generally allows the operating system to correlate the registered application with a particular URI and other related information that is received from a web server via a web browser as part of a custom URI protocol of the type disclosed herein. Such registration illustratively allows the operating system to subsequently trigger, activate or otherwise notify the agent application to undertake certain operations responsive to receipt of such information.

In step 204, in conjunction with initiation of the authentication process via a web browser of the client device, a URI is obtained from the web server, with the URI corresponding to a particular endpoint of the web server, and the URI is made accessible to the agent application via the operating system. It should be noted that the term "obtaining" in this context is intended to be broadly construed, so as to encompass, for example, receiving the URI as part of an encrypted message payload that is decrypted by the agent application to obtain the URI and a corresponding nonce value generated by the web server.

In step 206, one or more authentication operations of the authentication process are carried out at least in part through interaction between the agent application and the particular endpoint of the web server. Such operations illustratively utilize the above-noted nonce value obtained from the web server. The interactions between the agent application and the particular endpoint of the web server illustratively utilize bidirectional out-of-band communication that bypasses the web browser.

The particular processing operations and other system functionality described in conjunction with the flow diagram of FIG. 2 are presented by way of illustrative example only, and should not be construed as limiting the scope of the present disclosure in any way. Alternative embodiments can use other types of processing operations to implement agent-based authentication as disclosed herein. For example, certain steps may be performed at least in part concurrently with one another rather than serially. As additional examples, at least portions of the process steps may be repeated periodically for different authentication instances, and multiple such instances can be performed in parallel with one another to allow one or more users to obtain access to different protected resources.

Also, functionality such as that described in conjunction with the flow diagram of FIG. 2 can be implemented at least in part in the form of one or more software programs stored in program code of at least one memory and executed by at least one processor in one or more processing devices implementing an agent-based authentication process as disclosed herein. A storage device or other memory having executable program code of one or more software programs embodied therein is an example of what is more generally referred to herein as a "processor-readable storage medium."

The foregoing example process is therefore illustrative only, and should not be viewed as limiting the scope of any particular embodiment in any way. Those skilled in the art will appreciate that numerous alternative authentication arrangements for agent-based authentication can be used in other embodiments.

Additional illustrative embodiments of agent-based authentication arrangements will now be described with reference to FIGS. 3, 4 and 5.

Figure 3:
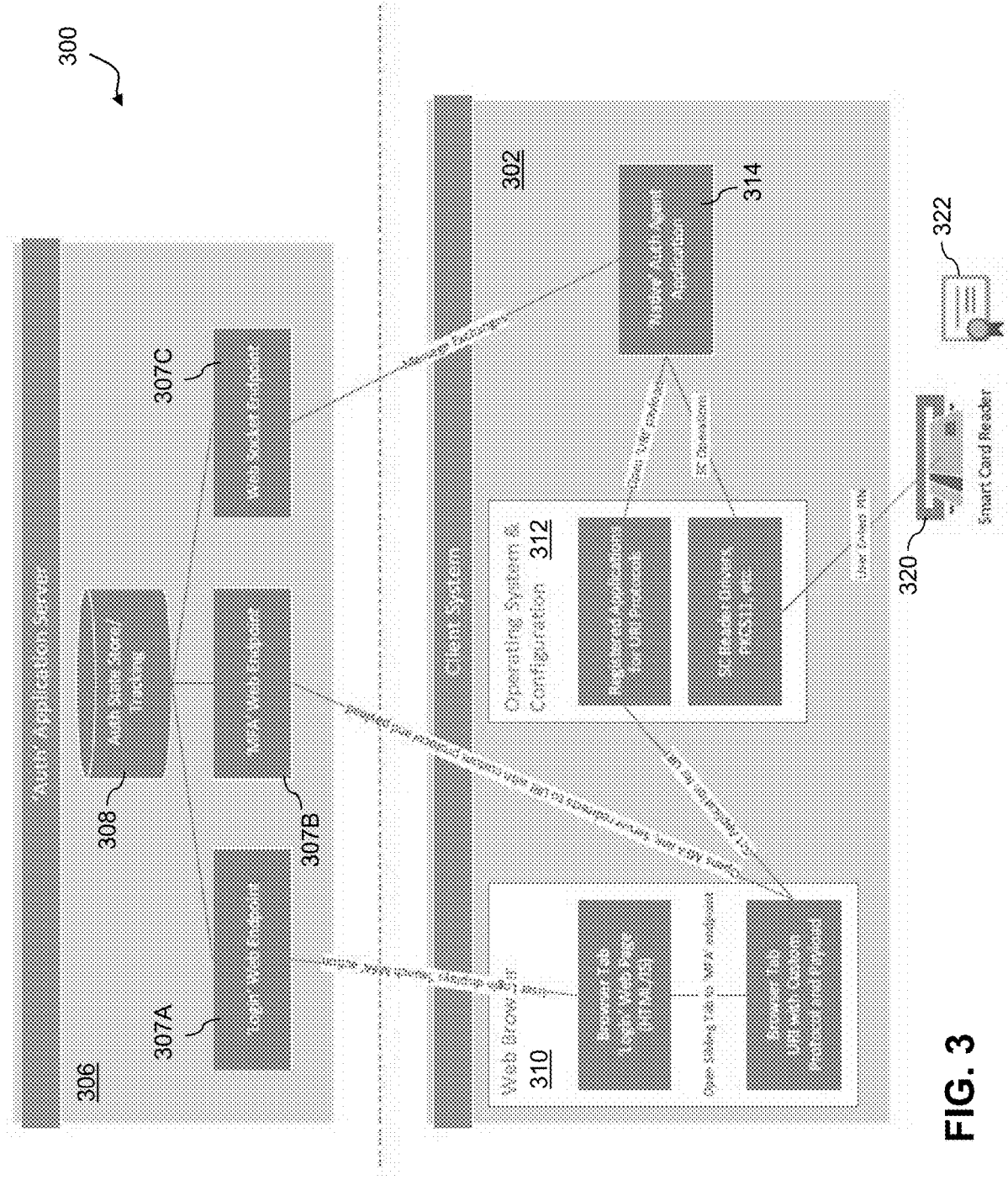
FIG. 3 illustrates a more detailed view of an example arrangement showing interaction between client-side components and web server components of an information processing system in an illustrative embodiment.

Referring now to FIG. 3, an information processing system 300 comprises a client system 302, which is considered an example of a "client device" as that latter term is broadly used herein, and a web server 306, also denoted as an authentication ("Auth") application server. The web server 306 comprises a set of endpoints 307 that more particularly comprise a login endpoint 307A, an MFA endpoint 307B and a WebSocket endpoint 307C. These web server endpoints, also denoted in the figure as web endpoints, interact with an authentication state store and tracking service 308. In some embodiments, component 308 illustratively comprises only one or more tracking services, and utilizes an external authentication store, which may be implemented elsewhere on the corresponding web server 306 or on one or more other processing devices of the system 300.

The client system 302 in this embodiment comprises a web browser 310, an operating system 312 and associated configuration components, and an agent application 314, the latter also referred to as a "native" authentication agent application. The web browser 310 is associated with a user 301.

The web browser 310 opens a first browser tab with the login endpoint 307A to reach a login web page, illustratively using HyperText Markup Language (HTML) and JavaScript (JS), and is redirected by the login endpoint 307A to open a second browser endpoint with the MFA endpoint 307B in order to obtain from the MFA endpoint 307B a URI using a custom URI protocol and encrypted URI payload. The web browser 310 notifies the operating system 312 as shown, and the operating system 312 utilizes its stored set of registered applications for respective URI protocols to trigger the agent application 314 to open the encrypted URI payload so as to obtain the URI and corresponding nonce value.

The agent application 314 can then perform SmartCard (SC) operations with a SmartCard inserted in a SmartCard reader 320 of the client system 302, illustratively utilizing one or more SC drivers, and one or more application programming interfaces (APIs) configured in accordance with a Public-Key Cryptography Standard (PKCS), such as a PKCS11 API. The SmartCard in the present embodiment is assumed to have an associated certificate 322 that is utilized by the agent application 314 in its interactions with the WebSocket endpoint 307C as part of the authentication process.

Figure 4:
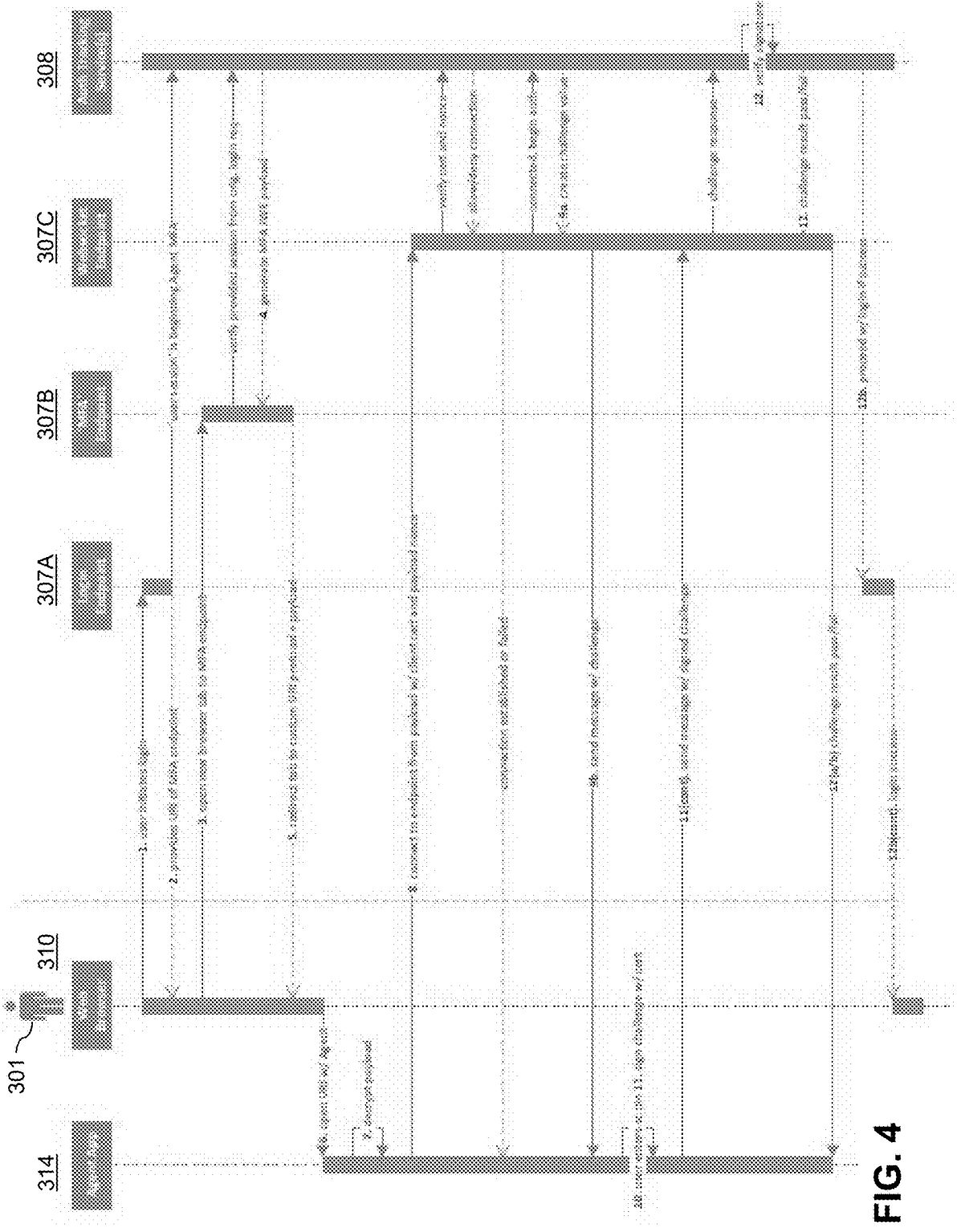
FIG. 4 is a signaling diagram illustrating example interactions between client-side components and web server components in the FIG. 3 embodiment.

Referring now to FIG. 4, a signaling diagram details example authentication interactions between the client-side components, including web browser 310 and agent application 314, and the server-side components, including the endpoints 307 and the component 308 comprising at least one or more tracking services, in the system 300. Prior to these interactions, a setup of the system 300 is illustratively performed as follows:

1. Web server 306 is configured with the necessary root certificates to verify that a given SmartCard is valid (e.g., obtained from SmartCard vendor, organization, etc.)

2. Additionally, the public key of the SmartCard's certificate 322 is captured and stored, to be made available during authentication. This is correlated to the identity (e.g., username, etc.) of the user.

3. Agent application 314 is installed on the client system 302, and provisioned with a certificate unique to the agent application 314 and the client system 302.

4. The agent application 314 is registered with the operating system 312 as the application to handle a particular custom URI protocol.

5. The agent application 314 is provisioned with the necessary key material to decrypt content provided by the web server 306 (e.g., transmitted via JWE).

The example operations associated with authentication of a user then proceed as follows, as generally illustrated in the FIG. 4 signaling diagram:

1. User navigates to login endpoint 307A of a web application of web server 306. The web application illustratively comprises the endpoints 307, and in some embodiments may comprise at least one or more authentication tracking services of the authentication state store and tracking service 308.

2. The web application determines if MFA login is required for the user session (e.g., through user selection or server-side configuration). Assuming the result of the determination is that MFA login is required, the login endpoint 307A provides a URI of the MFA endpoint 307B to the web browser 310.

3. The web browser 310 opens a new browser tab to the MFA endpoint 307B. The MFA endpoint 307B interacts with component 308 to verify the provided session information from the original login request.

4. The component 308 generates and provides to the MFA endpoint 307B a constructed URI message comprising a custom URI protocol matching the expectation of the agent application (e.g., my-custom-protocol://), and an encrypted JSON payload using the JWE format. This JWE payload illustratively comprises the URI of a dedicated endpoint provided by the web server 306 to be used for further authentication, which in this example is the URI of the WebSocket endpoint 307C, and a nonce value used to identify the login request and correlated to the original user session.

5. The MFA endpoint 307B redirects the browser tab to the custom URI protocol and encrypted payload of the constructed URI message.

6. The web browser 110 interacts with operating system 312 to invoke the agent application 314 to handle the URI message.

7. The agent application 314 uses the previously configured key to decrypt the encrypted JWE payload and retrieve the target URI, illustratively the URI of WebSocket endpoint 307C, and the corresponding nonce value.

8. The agent application 314 sends a request to open a secure WebSocket (WSS) connection to the URI of WebSocket endpoint 307C, with the request including the configured certificate unique to the agent application 314 and client system 302, and the nonce value, illustratively by way of the authorization header. The WebSocket endpoint 307C interacts with component 308 to verify the certificate and nonce, and the component 308 will allow or deny the connection accordingly. The WebSocket endpoint 307C notifies the agent application 314 as to whether the connection attempt is successful and the connection is established, or the connection attempt has failed.

9. Once the agent application 314 successfully connects to the WebSocket endpoint 307C:
   a. The WebSocket endpoint 307C notifies the component 308 of the successful connection, and the component 308 securely creates a challenge value, illustratively as a random value; and
   b. The WebSocket endpoint 307C sends a message including the challenge value to the connected agent application 314.

10. The agent application 314 prompts the user to enter a SmartCard PIN, and the user provides the PIN.

11. The agent application 314 signs the challenge value and sends a message containing the signed challenge to the WebSocket endpoint 307C. The WebSocket endpoint 307C provides a corresponding challenge response to the component 308.

12. The component 308 validates the provided signed challenge against the SmartCard known to belong to the user, and provides a corresponding pass/fail challenge result to the WebSocket endpoint 307C, with further processing as follows:
   a. If the challenge result indicates failure, the WebSocket endpoint 307C provides one or more messages to the agent application 314 detailing the failure; and
   b. If the challenge result indicates success, the WebSocket endpoint 307C notifies the agent application 314 accordingly, and component 308 directs the login endpoint 307A to complete the user's original login request, such that the user is allowed to proceed.

As with other embodiments herein, the particular operations in this example are illustrative only, and should not be construed as limiting in any way. Alternative embodiments can use different types and arrangements of operations.

Referring now to FIG. 5, which includes separate portions denoted as FIG. 5A and FIG. 5B, an example of a URI message payload that may be generated by the web server 306 is shown in FIG. 5A. The URI message payload includes a custom URI protocol that includes an action ("authenticate"), an endpoint URI, and a nonce, arranged as shown. A corresponding encrypted message payload is shown in FIG. 5B.

The illustrative embodiments of FIGS. 3, 4 and 5, like other embodiments disclosed herein, are presented by way of example only, and the features and functionality thereof should not be considered as limiting in any way.

Numerous alternative arrangements can be implemented utilizing the disclosed agent-based authentication techniques.

For example, instead of collecting user identity from a web browser and additional factors through the agent application, in other embodiments a user can initiate authentication from the web browser and provide all identity information via out-of-band communication between the agent application and the WebSocket endpoint, correlated with the user session via the nonce value described elsewhere herein. The agent application and WebSocket endpoint allow authentication to take place over multiple interactions. For example, a user could provide username and/or password, then be prompted for SmartCard, then something else, etc. This could be a mitigation against a hypothetical man-in-the-middle (MITM) attack if such an attack were focused on normal web ports, public certificates, etc.

Some embodiments disclosed herein address authentication during login, avoiding the pitfalls of client certificates in the browser and limitations in handling logout. As an alternative, the WebSocket endpoint connection between the web server and the agent application could be kept alive for the duration of the user session with the web application. The web server would be able to repeatedly verify, via the agent application, that the SmartCard, and/or other authentication factor, is still present. As soon as the SmartCard is removed, the agent application will be able to inform the web server and the web server can forcibly terminate any access from the user session within the web application. The web server will also be able to quickly terminate the user session if the agent application stops communicating, or if a periodic re-verification of the attached SmartCard fails.

Additionally or alternatively, the agent application in some embodiments can be configured to provide the web server with environmental details about the client system at the time of login, either as part of an additional factor of an authentication policy, or simply for audit purposes, threat detection, etc.

Examples of information which the agent application could provide to the server at time of login include one or more of the following:

1. A report of all running processes on the client system (e.g., "don't let a user login if they are running screen capture software").
2. A trace of the network route to the web application or authentication endpoint (e.g., "raise a security alert if a user's connection is not taking the expected network route").

The agent application, being a separate process, is also not subject to browser security policies, and can be granted additional access which an IT department or conventional security practices deem inappropriate for a web browser.

For example, in highly sensitive or rights-managed environments, it may be desirable for the agent application to have permission to access attached camera hardware. At time of login, the agent application could capture a short video or picture to send to the web server for the purposes of server-side facial recognition, or simply for security audit purposes in the event of an incident.

It should be noted that agent-based authentication techniques as disclosed herein can be applied in a wide variety of other contexts, including one or more of the following:

1. Collection of personal signatures via attached hardware or touchscreen. Such an arrangement provides the potential for better user experience compared to inputting a signature in a browser through pre-canned fonts (e.g., DocuSign). This could also be an additional authentication factor, and the agent application could be configured to require physical signatures agreeing to policies or terms of use.
2. Interaction with point-of-sale hardware, or other proprietary hardware in a retail/consumer environment. For example, a user that needs to complete a payment transaction is redirected to an agent application which communicates with payment processing hardware (e.g., PIN pad, etc.) In another example, a user completes a transaction, and a web-based point-of-sale system can redirect to an agent application attached to on-premise hardware such as receipt printer, order workflow processing, signage, etc.

As indicated previously, illustrative embodiments provide a number of significant advantages relative to conventional arrangements.

For example, some embodiments provide techniques for highly secure and flexible authentication that avoid the drawbacks of conventional approaches, such as the conventional client certificate authentication described elsewhere herein.

The disclosed techniques advantageously facilitate authentication of legacy SmartCards and other MFA arrangements for which authentication would otherwise be impossible or impractical using a modern web browser.

Illustrative embodiments enhance end-to-end security of the authentication process, and include an ability to provide non-repudiation of users and their associated client devices. The disclosed agent application in some embodiments acts as a bridge to legacy MFA technologies, and can provide native interactions with SmartCards or other physical MFA arrangements that modern web browsers no longer support.

The agent-based authentication techniques disclosed herein provide a significant improvement over established practice. For example, such techniques can allow organizations to maintain legacy MFA technologies such as Smart-Cards in their IT environments.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement processing devices with agent-based authentication functionality will now be described in greater detail with reference to FIGS. 6 and 7. Although described in the context of system 100, these platforms may also be used to implement at least portions of other information processing systems in other embodiments.

Figure 6:
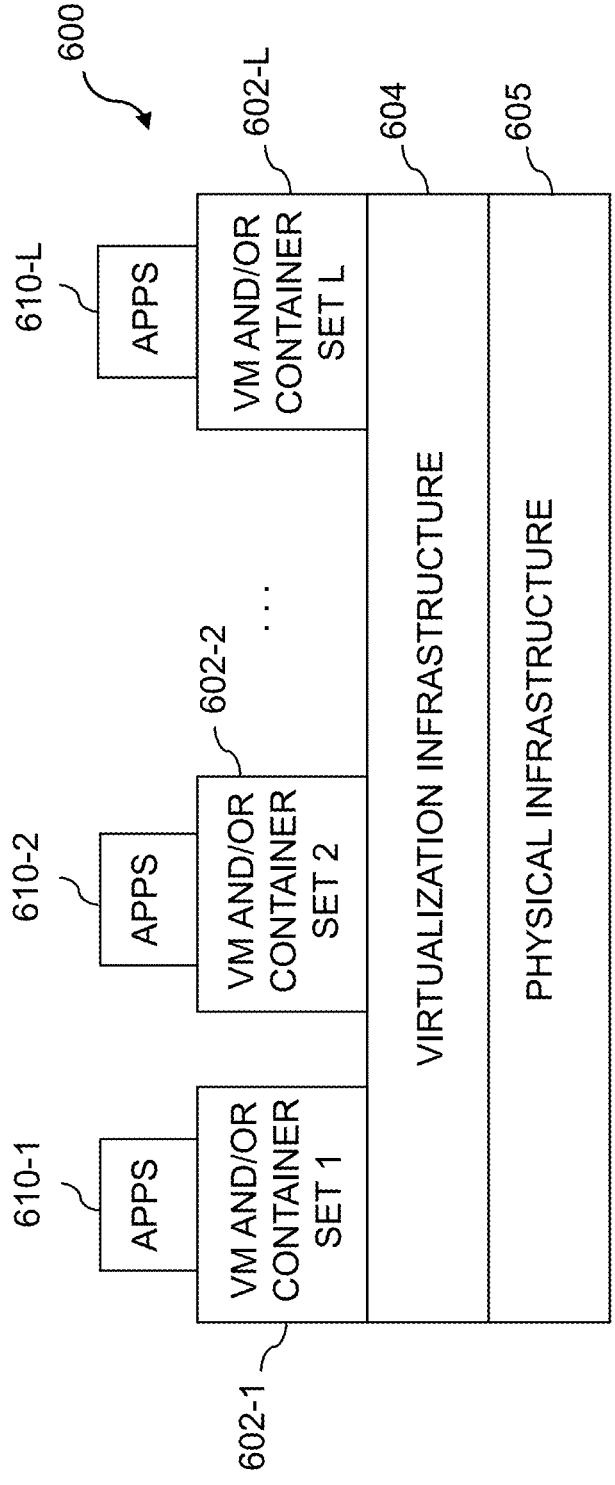
FIGS. 6 and 7 show examples of processing platforms that may be utilized to implement at least a portion of an information processing system in illustrative embodiments.
Figure 7:
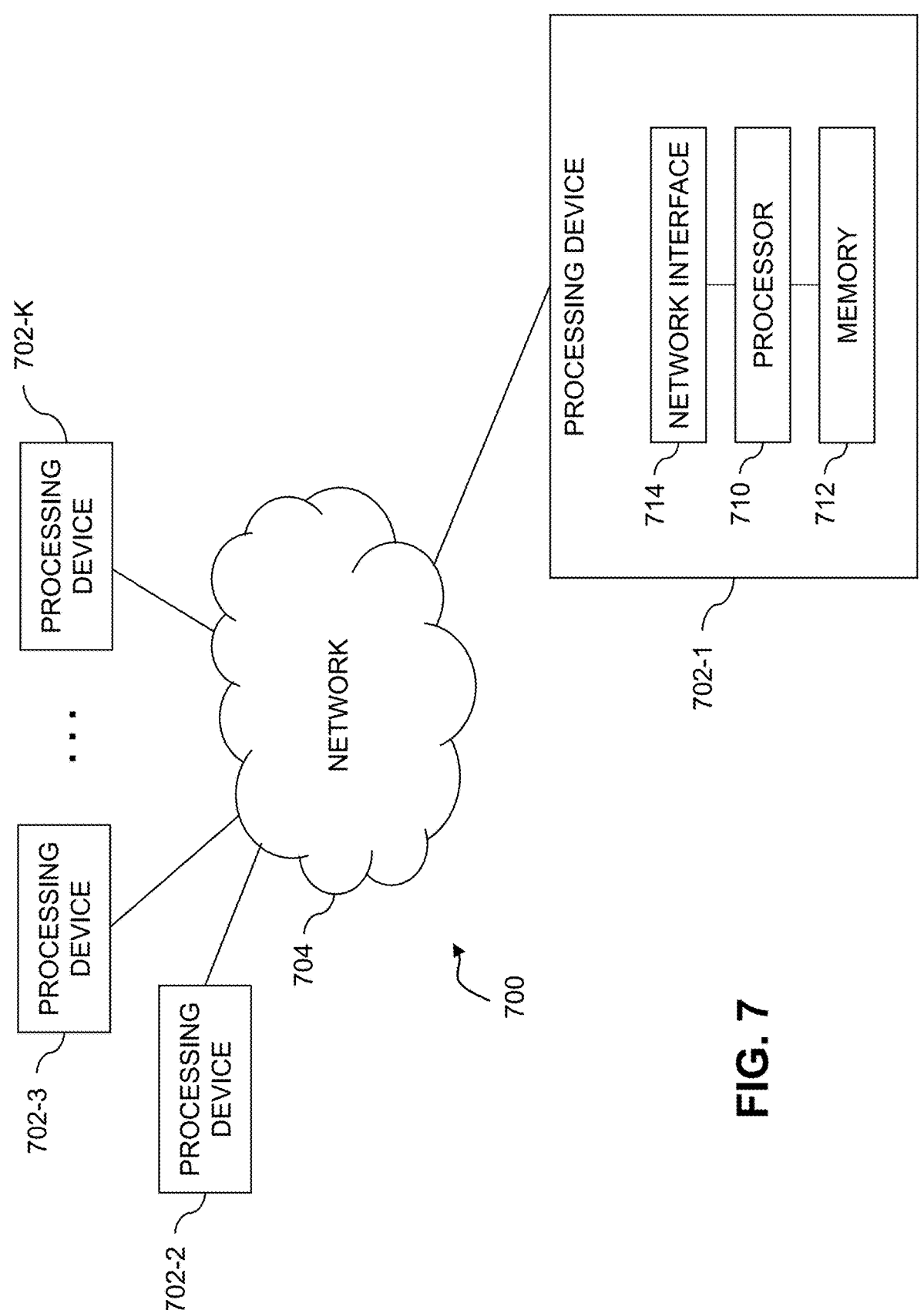

FIG. 6 shows an example processing platform comprising cloud infrastructure 600. The cloud infrastructure 600 comprises a combination of physical and virtual processing resources that may be utilized to implement at least a portion of the information processing system 100. The cloud infrastructure 600 comprises multiple virtual machines (VMs) and/or container sets 602-1, 602-2, . . . 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, . . . 610-L running on respective ones of the VMs/container sets 602-1, 602-2, . . . 602-L under the control of the virtualization infrastructure 604. The VMs/container sets 602 may comprise respective VMs, respective sets of one or more containers, or respective sets of one or more containers running in VMs.

In some implementations of the FIG. 6 embodiment, the VMs/container sets 602 comprise respective VMs implemented using virtualization infrastructure 604 that comprises at least one hypervisor. Such implementations can provide at least portions of the disclosed agent-based authentication functionality in an information processing system of the type described above using one or more processes running on a given one of the VMs. For example, each of the VMs can implement logic instances and/or other components providing agent-based authentication functionality in the system 100.

A hypervisor platform may be used to implement a hypervisor within the virtualization infrastructure 604. Such a hypervisor platform may comprise an associated virtual infrastructure management system. The underlying physical machines may comprise one or more distributed processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system. Such implementations can also provide at least portions of the disclosed agent-based authentication functionality in an information processing system of the type described above. For example, a container host device supporting multiple containers of one or more container sets can implement logic instances and/or other components providing agent-based authentication functionality in the system 100.

As is apparent from the above, one or more of the processing devices or other components of system 100 may each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises a portion of system 100 and includes a plurality of processing devices, denoted 702-1, 702-2, 702-3, . . . 702-K, which communicate with one another over a network 704.

The network 704 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 702-1 in the processing platform 700 comprises a processor 710 coupled to a memory 712.

The processor 710 may comprise a microprocessor, a microcontroller, an application-specific integrated circuit (ASIC), a field-programmable gate array (FPGA), graphics processing unit (GPU) or other type of processing circuitry, as well as portions or combinations of such circuitry elements.

The memory 712 may comprise random access memory (RAM), read-only memory (ROM), flash memory or other types of memory, in any combination. The memory 712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise various arrangements of converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the agent-based authentication functionality provided by one or more components of an information processing system as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, client devices, web browsers, agent applications, networks, web servers, web applications, endpoints, authentication processes, access credentials, protected resources and additional or alternative components. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:

at least one processing device comprising a processor coupled to a memory;

wherein the at least one processing device is configured:

to implement an agent application for supporting an authentication process between a client device and a web server over at least one network;

to register the agent application with an operating system of the client device;

in conjunction with initiation of the authentication process via a web browser of the client device, to obtain a uniform resource identifier from the web server, the uniform resource identifier corresponding to a particular endpoint of the web server, and to make the uniform resource identifier accessible to the agent application via the operating system; and to carry out one or more authentication operations of the authentication process at least in part through interaction between the agent application and the particular endpoint of the web server;

wherein the particular endpoint comprises one of a plurality of distinct endpoints of the web server, each such endpoint being implemented in its entirety within the web server;

wherein responsive to a user login to a first one of the plurality of distinct endpoints of the web server via the web browser, the web browser is provided by the first endpoint with an identifier of a second one of the plurality of distinct endpoints and accesses the second endpoint to obtain an encrypted message payload from the second endpoint;

wherein the encrypted message payload is provided by the web browser to the agent application and decrypted by the agent application; and wherein the agent application utilizes cryptographic information obtained from the decrypted message payload to carry out the one or more authentication operations of the authentication process with the particular endpoint, the particular endpoint being an additional one of the plurality of distinct endpoints of the web server different than the first endpoint and the second endpoint.

2. The apparatus of claim 1 wherein the at least one processing device comprises at least a portion of the client device.

3. The apparatus of claim 1 wherein registering the agent application with the operating system of the client device comprises registering the agent application as a handler application for a protocol utilizing the uniform resource identifier, the protocol being triggered by receipt of the uniform resource identifier in the operating system from the web browser.

4. The apparatus of claim 1 wherein the particular endpoint of the web server comprises a WebSocket endpoint of the web server.

5. The apparatus of claim 1 wherein the agent application is configured for bidirectional out-of-band communication with the particular endpoint of the web server, and further wherein the bidirectional out-of-band communication between the agent application and the particular endpoint of the web server bypasses the web browser.

6. The apparatus of claim 1 wherein the authentication process comprises a multi-factor authentication (MFA) process involving a SmartCard, and wherein the one or more authentication operations carried out at least in part through interaction between the agent application and the particular endpoint of the web server comprise authenticating the SmartCard.

7. The apparatus of claim 1 wherein the first endpoint and the second endpoint of the plurality of distinct endpoints of the web server comprise a login endpoint and an MFA endpoint, respectively.

8. The apparatus of claim 7 wherein the web browser of the client device initiates the user login via a first browser tab to the login endpoint of the web server and based at least in part on information provided to the web browser by the login endpoint opens a second browser tab to the MFA endpoint of the web server.

9. The apparatus of claim 7 wherein the MFA endpoint of the web server provides the uniform resource identifier to the web browser as part of the encrypted message payload that includes additional information to be utilized by the agent application in carrying out the one or more authentication operations.

10. The apparatus of claim 1 wherein the agent application is configured with access to key material to be used in the authentication process and is further configured with an associated certificate unique to the agent application and the client device.

11. The apparatus of claim 10 wherein the agent application utilizes at least a portion of the key material to decrypt the encrypted message payload to obtain the uniform resource identifier and additional information to be utilized by the agent application in carrying out the one or more authentication operations.

12. The apparatus of claim 11 wherein the additional information comprises at least one nonce value generated by the web server.

13. The apparatus of claim 12 wherein the agent application attempts to establish a secure connection to the particular endpoint at the uniform resource identifier at least in part by providing its certificate and the nonce value to the particular endpoint.

14. The apparatus of claim 13 wherein the particular endpoint initiates verification of the certificate and nonce value provided by the agent application, and responsive to successful verification of the certificate and nonce value, the particular endpoint establishes the secure connection, correlates the certificate and nonce value with a corresponding user login attempt previously initiated by the web browser, sends a challenge to the agent application, receives a corresponding response from the agent application, and determines an authentication result based at least in part on the corresponding response.

15. A computer program product comprising a non-transitory processor-readable storage medium having stored therein program code of one or more software programs, wherein the program code when executed by at least one processing device causes the at least one processing device:

to implement an agent application for supporting an authentication process between a client device and a web server over at least one network;

to register the agent application with an operating system of the client device;

in conjunction with initiation of the authentication process via a web browser of the client device, to obtain a uniform resource identifier from the web server, the uniform resource identifier corresponding to a particular endpoint of the web server, and to make the uniform resource identifier accessible to the agent application via the operating system; and to carry out one or more authentication operations of the authentication process at least in part through interaction between the agent application and the particular endpoint of the web server;

wherein the particular endpoint comprises one of a plurality of distinct endpoints of the web server, each such endpoint being implemented in its entirety within the web server;

wherein responsive to a user login to a first one of the plurality of distinct endpoints of the web server via the web browser, the web browser is provided by the first endpoint with an identifier of a second one of the plurality of distinct endpoints and accesses the second endpoint to obtain an encrypted message payload from the second endpoint;

wherein the encrypted message payload is provided by the web browser to the agent application and decrypted by the agent application; and wherein the agent application utilizes cryptographic information obtained from the decrypted message payload to carry out the one or more authentication operations of the authentication process with the particular endpoint, the particular endpoint being an additional one of the plurality of distinct endpoints of the web server different than the first endpoint and the second endpoint.

16. The computer program product of claim 15 wherein registering the agent application with the operating system of the client device comprises registering the agent application as a handler application for a protocol utilizing the uniform resource identifier, the protocol being triggered by receipt of the uniform resource identifier in the operating system from the web browser.

17. The computer program product of claim 15 wherein the agent application is configured for bidirectional out-of-band communication with the particular endpoint of the web server, and further wherein the bidirectional out-of-band communication between the agent application and the particular endpoint of the web server bypasses the web browser.

18. A method comprising:

implementing an agent application for supporting an authentication process between a client device and a web server over at least one network;

registering the agent application with an operating system of the client device;

in conjunction with initiation of the authentication process via a web browser of the client device, obtaining a uniform resource identifier from the web server, the uniform resource identifier corresponding to a particular endpoint of the web server, and making the uniform resource identifier accessible to the agent application via the operating system; and carrying out one or more authentication operations of the authentication process at least in part through interaction between the agent application and the particular endpoint of the web server;

wherein the particular endpoint comprises one of a plurality of distinct endpoints of the web server, each such endpoint being implemented in its entirety within the web server;

wherein responsive to a user login to a first one of the plurality of distinct endpoints of the web server via the web browser, the web browser is provided by the first endpoint with an identifier of a second one of the plurality of distinct endpoints and accesses the second endpoint to obtain an encrypted message payload from the second endpoint;

wherein the encrypted message payload is provided by the web browser to the agent application and decrypted by the agent application;

wherein the agent application utilizes cryptographic information obtained from the decrypted message payload to carry out the one or more authentication operations of the authentication process with the particular endpoint, the particular endpoint being an additional one of the plurality of distinct endpoints of the web server different than the first endpoint and the second endpoint; and wherein the method is performed by at least one processing device comprising a processor coupled to a memory.

19. The method of claim 18 wherein registering the agent application with the operating system of the client device comprises registering the agent application as a handler application for a protocol utilizing the uniform resource identifier, the protocol being triggered by receipt of the uniform resource identifier in the operating system from the web browser.

20. The method of claim 18 wherein the agent application is configured for bidirectional out-of-band communication with the particular endpoint of the web server, and further wherein the bidirectional out-of-band communication between the agent application and the particular endpoint of the web server bypasses the web browser.

* * * * *